Jan. 14, 1947.  A. SIMMON ET AL  2,414,338
CONTRAST CONTROL FOR PHOTOGRAPHIC ENLARGERS AND PRINTERS
Filed Nov. 9, 1945  5 Sheets-Sheet 1

Alfred Simmon
Louis L. Weisglass
INVENTORS

BY Walter E. Wollheim
ATTORNEY.

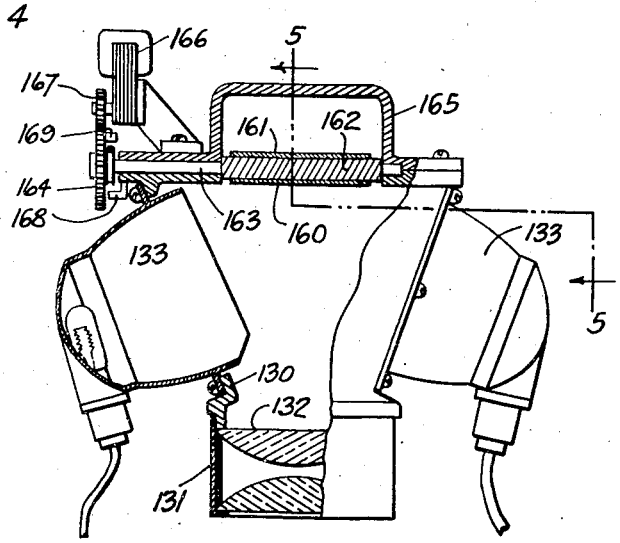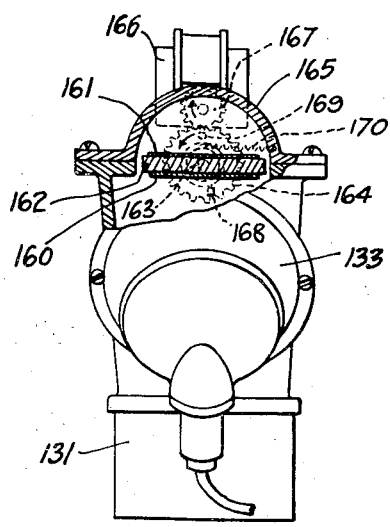

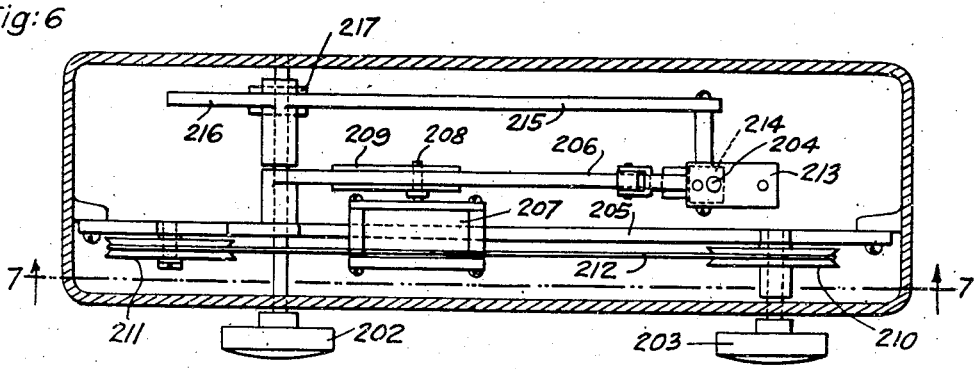
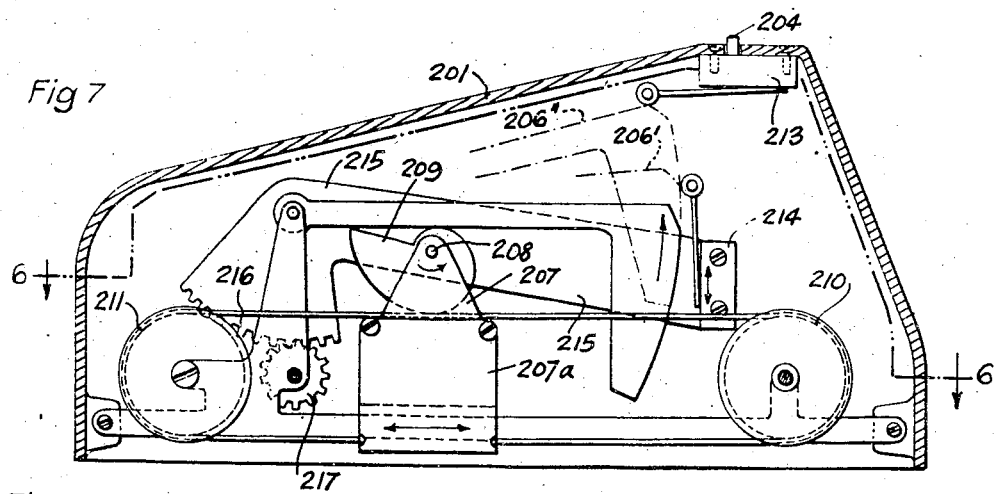
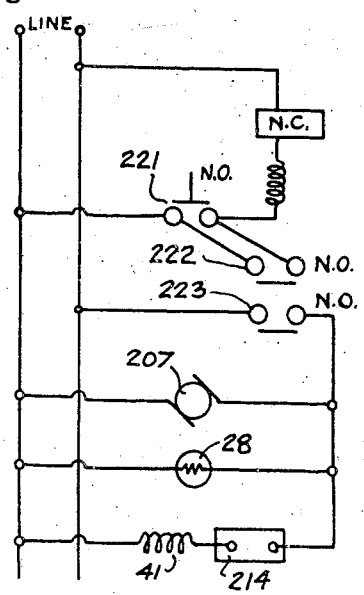
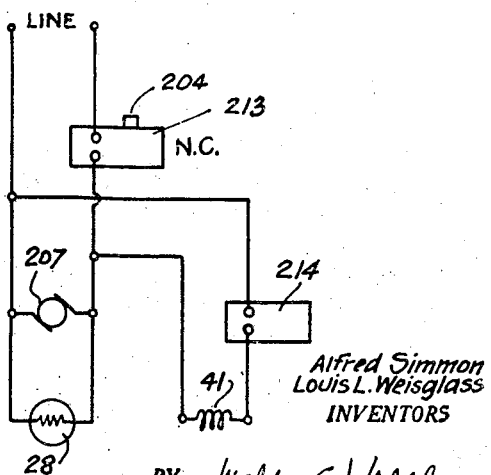

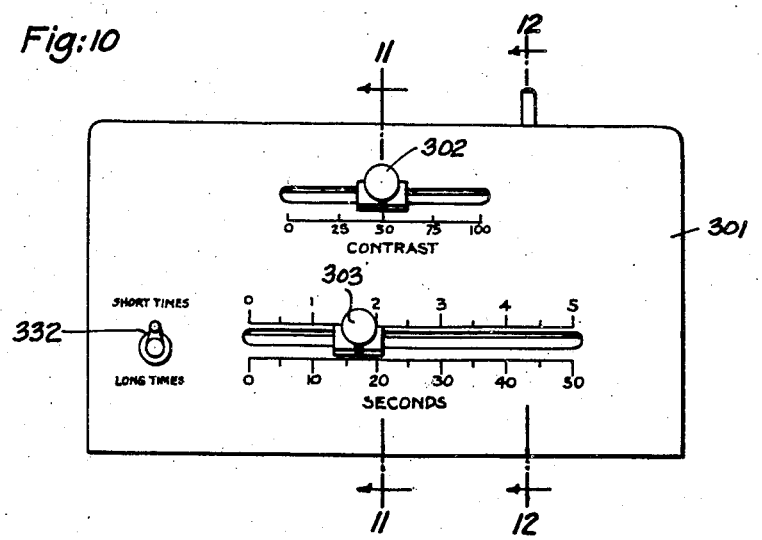
Fig:10
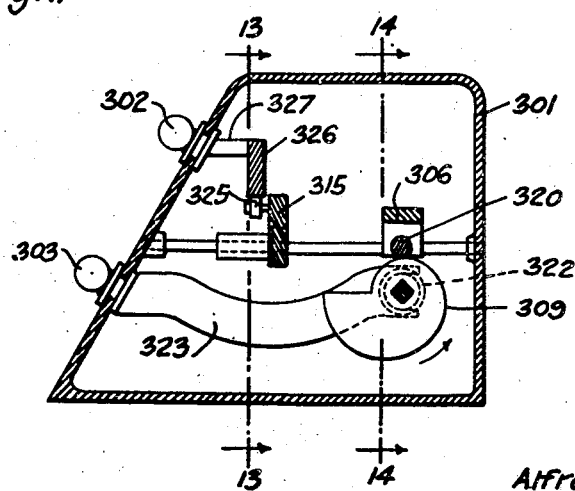
Fig:11
Alfred Simmon
Louis L. Weisglass
INVENTORS
BY Walter E. Wollheim
ATTORNEY.

Jan. 14, 1947.  A. SIMMON ET AL  2,414,338
CONTRAST CONTROL FOR PHOTOGRAPHIC ENLARGERS AND PRINTERS
Filed Nov. 9, 1945  5 Sheets-Sheet 5
Fig: 13
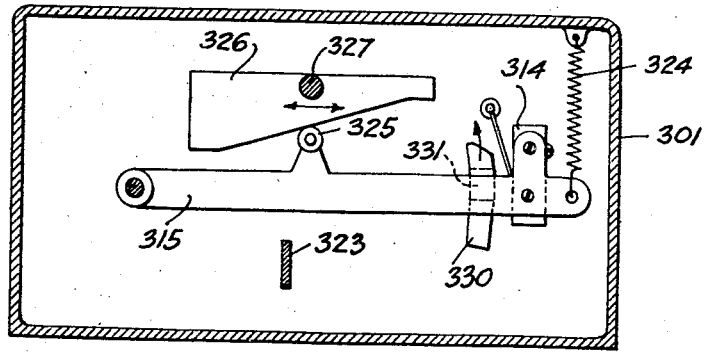
Fig: 14
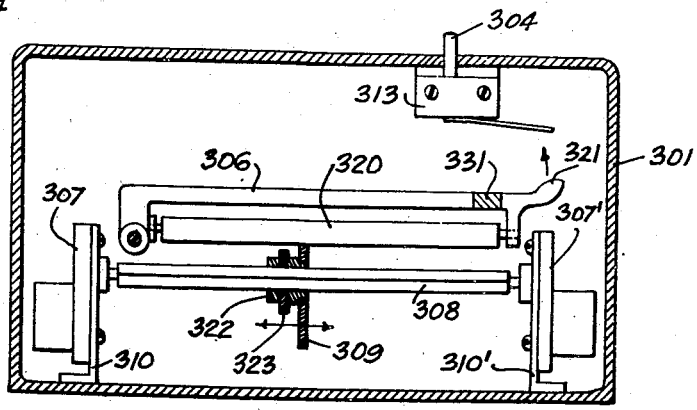
Fig: 12
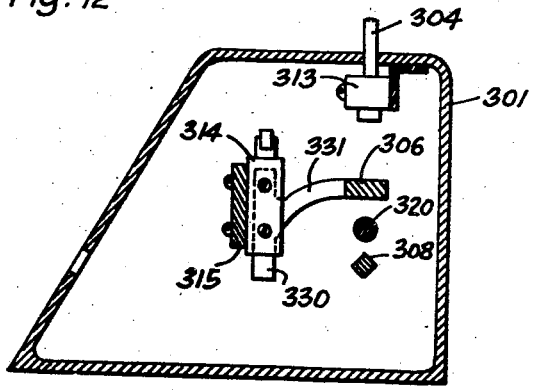
Alfred Simmon
Louis L. Weisglass
INVENTORS
BY Walter E. Wollheim
ATTORNEY.

Patented Jan. 14, 1947

2,414,338

UNITED STATES PATENT OFFICE 2,414,338

CONTRAST CONTROL FOR PHOTOGRAPHIC ENLARGERS AND PRINTERS

Alfred Simmon, Jackson Heights, and Louis L. Weisglass, New York, N. Y., assignors to Simmon Brothers, Inc., Long Island City, N. Y., a corporation of New York Application November 9, 1945, Serial No. 627,730

12 Claims. (Cl. 88—24)

A light sensitive paper has recently been developed which is capable of delivering prints of photographic negatives in any degree of contrast from extremely "hard" to extremely "soft" depending upon the wave length of the light to which it is being exposed. With blue light a very high degree of contrast is obtained, while with yellow light the gradation is very soft. Intermediate degrees of contrast can be obtained by exposing the paper subsequently to light of either color, the contrast in this case depending upon the ratio of the "blue" exposure time to the "yellow" exposure time. The use of this paper, therefore, necessitates, first, an estimate of the total necessary exposure time, depending upon the density of the photographic negative, and second, a division of this exposure time into two suitable portions for the "blue" and "yellow" exposure, respectively, depending upon the gradation of the negative, and, finally, a double exposure with the two proper exposure times through a blue and yellow filter, respectively. It is the purpose of this invention to provide mechanical and electrical means to this end.

The contrast control device consists of three principal parts, i. e., the enlarger or printer proper, which comprises a source of light, a color changing device and a timing device.

In the drawings in which a typical enlarger is shown equipped with a preferred form of a color changing device comprising two color filters and a timing device, Fig. 1 is a side view of the whole assembly, partly in section;

Fig. 4 is another color changing device embodied in the lamp housing of the projector carriage of another type of enlarger;

Fig. 5 is a partial cross sectional view along the plane of line 5—5 in Fig. 4;

Fig. 6 is a horizontal sectional view through the timing device shown in Fig. 1, but drawn in a larger scale;

Fig. 7 is a vertical sectional view along the plane of line 7—7 in Fig. 6;

Fig. 8 is an electric circuit diagram applicable to the timing device;

Fig. 9 is another modified electric circuit diagram applicable to the same device;

Fig. 10 is an elevational view of a modified timing device;

Fig. 11 is a cross sectional view along the plane of line 11—11 in Fig 10;

Fig. 12 is a cross sectional view along the plane of line 12—12 in Fig. 10;

Fig. 13 is a longitudinal sectional view along the plane of line 13—13 in Fig. 11; and Fig. 14 is a longitudinal sectional view along the plane of line 14—14 in Fig. 11.

Like characters of reference denote similar parts throughout the several views and the following specification.

Figure 1:
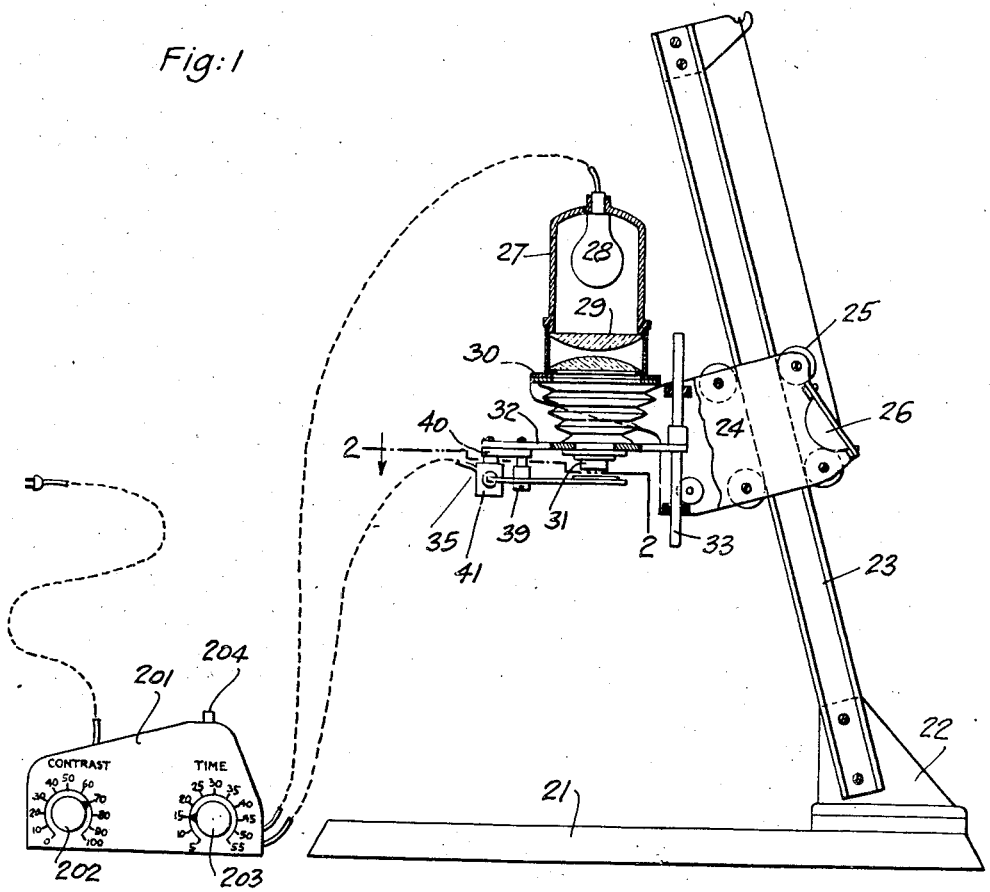

The general principle of this invention is illustrated in Fig. 1 which shows a photographic enlarger, a filter shifting device, and an automatic time switch which controls the total exposure time, as well as the proportionate share of the two color filters. As shown, the latter adjustment is arbitrarily divided into divisions, determining the contrast of the print.

It will be understood that the enlarger shown in this drawing is merely a typical example and that enlargers of other designs, as well as contact printers, can be equally well used with this invention.

The enlarger shown in this instance consists of a baseboard 21 on which a suitable bracket 22 is mounted. Fastened to this bracket are U channels 23 on which a projector carriage 24 slides. This movement is facilitated by rollers 25, and the weight of the entire projector assembly is counter-balanced by a spring 26. The projector proper comprises a lamp housing 27, containing an incandescent lamp 28 and a double condenser 29. Immediately under the condenser is positioned a holder 30 for the photographic negative. A lens 31 projects an enlarged image of the negative onto the baseboard 21 which, during exposure, supports the light sensitive paper. The lens 31 is mounted on a lens carrier 32, the position of which can be adjusted vertically with respect to the negative 30 by means of a friction drive 33. This drive is actuated by the operator until a sharp image of the photographic negative appears in the plane of the sensitive or bromide paper on the baseboard. The lens carrier is connected to the filmholder 30 by means of a flexible but light-tight bellows 34. It will be understood that up to this point the enlarger as described is quite conventional.

Figure 2:
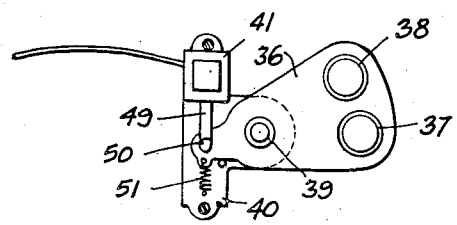
Fig. 2 is a horizontal sectional view of the filter shifting device along the plane of line 2—2 in Fig. 1 in one position.
Figure 3:
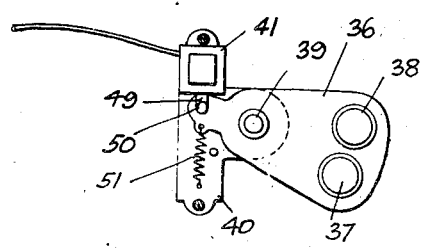
Fig. 3 is a similar sectional view in another position.

In front of the lens is shown a color filter assembly 35, and this assembly is shown in detail in Figs. 2 and 3. This assembly is similar to one described in application Serial #540,590, filed by us on June 16, 1944, now Patent Number 2,399,-577, issued April 30, 1946. It consists of a pivoted plate 36 which supports a yellow filter 37 and a blue filter 38. The plate 36 can perform a rotary motion around pivot 39 which is secured to a stationary base plate 40 fastened to the above mentioned lens carrier 32. Mounted upon this base plate 40 is a solenoid 41 which by means of a connecting rod 49, engages plate 36 at a point 50. A spring 51 is provided holding the filter support 36 ordinarily in the position shown in Fig. 2. As soon as solenoid 41 is energized, it moves the connecting rod 49 and thereby rotates the filter support 36 so that it now assumes a position shown in Fig. 3. It is understood that the force of the solenoid is considerably stronger than the force of spring 51. It will be clear that with this arrangement, yellow filter 37 is in front of the lens as long as the solenoid is not energized, and blue filter 38 is in front of the lens as soon as current is supplied to solenoid 41.

This electrically operated filter changing device can, of course, be widely modified. For example, it may be advantageous to use a small torque motor instead of a magnet since this is less liable to introduce vibrations. It may also be advisable to position the filter assembly not immediately in front of the lens, but between the lens and the negative, or between the negative and the condenser, or between the lamp and the condenser. The filter carrier 36 may also, instead of a rotary motion, perform a straight line sliding motion. Modifications of this nature, which are obvious to anybody skilled in the art, fall, of course, within the scope of this invention.

A different form of color control device can be used in connection with enlargers broadly disclosed in the three co-pending applications Serial #577,216, #609,873 and #614,208 filed by Louis L. Weisglass, one of the co-inventors herein.

The projector assembly of such enlargers comprises a conventional enlarging lens and a conventional condenser, but the source of light is a diffusely reflecting surface disposed substantially in the focal point of this condenser and illuminated by a spotlight. Compared to the conventional arrangement in said focal point of a lamp with an opal vessel and emitting diffused light, this arrangement offers a much better utilization of the available light and permits the application of much higher wattages than heretofore possible. For a detailed description of the general principle involved and for a discussion of the gains in efficiency and light output, we wish to refer to the co-pending application Serial #577,216.

A color control device applicable to this type of enlarger is shown in Figs. 4 and 5, showing the lamp housing part of the projector assembly only. This lamp housing consists of the main housing 130, the condenser with the condenser housing 131 and the condenser lenses 132, the two spotlights 133 and the colored reflector assembly.

Two reflectors 160 and 161 are provided which are mounted on opposite sides of a supporting plate 162. This supporting plate is fastened to a shaft 163 which terminates in a spur gear 164. The entire assembly is mounted in a housing 165 and a small motor 166 is provided which, by means of another spur gear 67 drives the aforementioned gear 164. The motor 166 is of the type which may be stalled for prolonged periods of time without overheating and which is commonly called "torque motor." The rotation of the supporting plate 162 is confined to 180° by means of a fixed stop 168 and a stop pin 169 on gear 164, and a spring 160 is provided which returns the reflector assembly to its original position as soon as the motor 166 is de-energized. An arrangement of this type can very advantageously be used in connection with a variable contrast paper of the "varigam" type. For example, the two reflector plates 160 and 161 may be of a yellow and blue color, respectively. The first portion of the exposure is given with the reflector assembly in the position shown in Fig. 7, i. e., reflector 160 in the lower or effective position. After a certain portion of the exposure has elapsed, current is supplied to the motor 166 which, by means of the gears 167 and 164 rotates shaft 163 and therewith the supporting plate 162 with the two reflectors 160 and 161. This rotation will come to a stop after 180° when the stop pin 169 comes in contact with the stop 168. From now on the reflector plate 161, which originally was in the upper or inactive position, will now be in the lower position, and the balance of the exposure will, therefore, be given by the color determined by the reflector plate 161. After the exposure is finished the motor 166 is disconnected, whereupon spring 170 returns the entire reflector plate assembly to its original position.

A timing device is shown in Figs. 6 and 7. Its outstanding characteristic is its faculty to control not only the exposure time, but independent thereof the two relative percentages of the two respective color exposures. The timing device comprises a housing 201 to which all parts are mounted and from which two control knobs 202 and 203 protrude. As can be seen from Fig. 1, knob 202 controls the contrast and cooperates with a dial calibrated in 100 parts indicating percentages of exposure to one color, exposure to the other color, of course, being equal to balance of 100%. Knob 203 controls the total exposure time and cooperates with a dial which is shown starting with 5 and ending with 55 seconds. This arrangement is merely chosen by way of example and any other range may be obtained if so desired. On top of the housing is a push button 204 by means of which the operator can initiate an exposure cycle. Mounted within housing 201 is a peculiarly shaped bracket 205 on which all component parts are mounted. This bracket has two ends with holes which are adapted to be fastened to corresponding lugs attached to housing 201. As can be seen, bracket 205 comprises a straight center portion, the purpose of which will be explained later, and various lugs to which various shafts, gears and wheels can be mounted.

The main part of the time switch is a pivoted lever 206. This lever is adapted to perform a rotary motion covering a relatively small angle during an exposure cycle. The lever is shown in its starting position and is again shown in dotted lines in an intermediate and in its final position. These positions are called 206' and 206'' respectively. This lever may be rotated by any convenient kind of motive power, but it is, of course, preferable to use a small synchronous electric motor of the type used for electric clocks. These motors are commercially available with a built-in speed reducing gear train of any desired ratio and with a magnetically operated gear shift which automatically engages and disengages the gear train when the motor is energized and de-energized. The drive shaft is then free to be returned to the starting position by suitable means such as a spring or by gravity. A motor of this type is shown in Figs. 6 and 7 as 207. Its output shaft 208 carries a spiral shaped cam 209. This spiral shaped cam is in operative contact with the aforementioned lever 206. The motor upon being energized turns in a counterclockwise direction indicated by the arrow, and thereby drives lever 206. The time switch is built on the principle that lever 206 always travels the same angular distance, but at a different and adjustable rate of speed. This rate of speed can be adjusted in any convenient manner and we have merely shown one of the simplest in which the speed change is effected by shifting motor 207 either to the right or to the left in a direction parallel to the starting position of lever 206. Motor 207 is mounted on a bracket 207a which slides on the aforementioned straight portion of bracket 205. This sliding motion may again be effected in any convenient manner and merely as a typical example we have shown two pulleys 210 and 211 which are connected by a flexible cable 212, the two free ends of which are attached to bracket 207a. Devices of this type are in common use for radio tuning devices and are quite satisfactory. Pulley 210 then is connected to the aforementioned knob 203 and it will be clear that rotation of knob 203 moves bracket 207a on the straight portion of bracket 205 thereby changing also the position of motor 207 and spiral cam 209 with respect to lever 206. Obviously, if the motor is pushed far to the left, only a small angle of rotation of cam 209 is needed in order to push lever 206 from this starting position as shown in solid lines to its end position 206'' as shown in dotted lines, and, therefore, the time elapsing between these two extreme positions becomes quite short. On the other hand, if motor 207 and cam 209 are pushed far to the right, substantially a full revolution of the cam will be required in order to shift the lever 206 between its two extreme limits. The exposure time then will be as long as possible.

A switch is arranged within the housing in such a manner that it is actuated by lever 206 at the end of its rotary travel. This lever must have lock-in characteristics, i. e., it must stay in its new position even after the removal of the actuating force and not automatically by spring force or other means return to its original position. In order to return it to its original position a special resetting device must be provided by means of which the entire cycle of operations can be stopped. A switch of this type is known as a switch of the "maintained contact" type and is shown in Fig. 7 diagrammatically as 213. Switches of this type are commercially known as "micro-switches" and are available in this "maintained contact" type with a resetting device actuated by the aforementioned push button 204. While it is very simple to use a switch of this type, this is not strictly necessary and the lock-in characteristics may be obtained by the combination of an ordinary switch of the so-called "momentary contact" type and a relay. The relay coil must be in series with an independent normally open push button and a separate set of relay contacts must be provided which are connected in parallel to the respective contacts of said push button thereby providing a hold-in or lock-in contact. The switch 213 in this case will not need a resetting device, such as indicated by push button 204, but an independent push button will be provided by means of which the operator can initiate an exposure cycle. This arrangement is not shown in Figs. 6 and 7 but a circuit diagram of this alternate arrangement is shown in Fig. 8.

The switch 213, either directly or by means of a relay, controls the total exposure time, i. e., it shuts off the light of the enlarger or printer as soon as lever 206 reaches the position 206'' making contact with switch 213. A second switch 214 is provided to actuate the color changing device. This color changing device must be actuated sooner or later depending upon the type of contrast that the operator wishes to obtain. Therefore, the position of switch 214 is adjustable in such a way that it will come in contact with the main lever 206 sooner or later during its rotary travel. The mechanical arrangement by means of which this adjustment is being made is not important and merely by way of an example we have shown switch 214 mounted on a bracket 215 which is connected to a gear segment 216. This gear segment, in turn, is actuated by a spur gear 217 which is attached to the aforementioned knob 202. Obviously, turning knob 202 in a clockwise direction will turn lever 215 in a counter-clockwise direction and will, thereby, raise switch 214 gradually increasing the percentage of the first color exposure until it reaches 100%. In the same manner turning knob 202 and gear 217 in a counter-clockwise direction will turn switch supporting lever 215 in a clockwise direction thereby lowering switch 214 and eventually bringing it into a position in which the first color exposure becomes 0%. Switch 214 may also be of the so-called "micro-switch" type but no lock-in characteristics are required and the switch will be of the so-called "momentary contact" type.

As stated before, two alternate circuit diagrams of the time switch are shown in Figs. 8 and 9. Fig. 8 makes use of a relay to supply the required lock-in characteristics for switch 213. The switch 213 is in this case a simple switch of the "momentary contact" type with normally closed (NC) contacts. It is in series with a relay coil 220 and a normally open (NO) push button 221. The relay is equipped with two independent sets of normally open (NO) contacts 222 and 223. The contacts 222 are connected to the corresponding contacts of the push button 221 thereby providing a hold-in or lock-in set of contacts. The two contacts 223 are in series with a circuit which comprises three parallel branches, the first branch containing the motor 207, the second branch containing the lamp 28 of the enlarger and the third branch containing, for example, the solenoid 41 of the color changing device in series with switch 214. It is immaterial whether switch 214 is normally open or normally closed, the only difference being that in one case the first color will be exposed first and second color later, whereas in the other case, the first color will be exposed later and the second color first.

The circuit diagram of Fig. 9 shows an alternate circuit which makes use of a switch of the "maintained contact" type, thereby dispensing with the relay. Switch 213 is normally closed and of the "maintained contact" type, being equipped with a push button 204 by means of which it can be reset. This switch controls three parallel circuits, one containing motor 202, the second lamp 228 and the third solenoid 41 and switch 214, which again may be either normally open or normally closed, but which must be of the "momentary contact" type without having any of the lock-in characteristics. Instead of solenoid 41 for the color changing device, the motor 166 of the device shown in Figs. 4 and 5 may, of course, be used.

The working function of the device may be fully understood from these drawings and circuit diagrams. In the case of Fig. 8, the operator momentarily actuates the push buttons and closes contacts 221. This energizes relay coil 220 thereby closing the two pairs of contacts 222 and 223. Since contacts 222 are now closed, the relay remains energized after the operator relinquishes push button 221. Therefore, the three branch circuits depending upon contacts 223 remain energized, i. e., the lamp lights up and the motor starts running thereby rotating lever 206. At some point of its travel, lever 206 comes in contact with switch 214 which we may assume to be of the normally open type. Upon being actuated by lever 206 this switch closes and energizes the solenoid 41 of the color changing device. Therefore, the second portion of the exposure takes a place with a color different from that of the first portion. Lever 206 continues its travel and eventually actuates switch 213 which is of the normally closed type and which now becomes open. This de-energizes the relay coil 220 thereby opening both contact pairs 222 and 223. Motor 207, upon being de-energized, automatically disengages its gear shift and permits lever 206 to drop back into its starting position. Lamp 28 becomes currentless, thereby terminating the exposure.

The circuit in Fig. 9 works in a very similar way. The switch 213 is here of the "maintained contact" type and, while it is of the normally closed type, its contact at the beginning of an exposure will be open, having remained so from the previous exposure. The operator by pushing the resetting button 224 restores its original position, i. e., closes it. This energizes motor 227 and lamp 28 but not as yet solenoid 41 if we assume switch 214 to be of the normally open type. As soon as lever 206 reaches switch 214 it closes it, thereby energizing solenoid 41 and actuating the color changing device. Lever 206 continues to rotate until it meets switch 213, thereby opening the circuit again which now, since this switch is of the "maintained contact" type remains open. Motor 207 again disengages its gear shift and permits lever 206 to drop into its starting position, and lamp 28 becomes currentless, thereby terminating the exposure.

Another modification of the timing device is shown in Figs. 10 and 14. This modification employs the same basic principle as, but is somewhat different in detail from, the structure shown in Figs. 6 and 7. The chief structural difference is that instead of shifting the motor with the spiral cam as a unit, the motor remains stationary and drives a shaft of square cross section. The spiral cam is equipped with a hub with a correspondingly square hole and is slidably mounted on the square shaft. This modification lends itself particularly well to a timer design with two different timing ranges, since it is very easy to use one motor on either end of the square shaft. These motors are equipped with reduction gears of different ratios, and it is preferable to have one motor run ten times as fast as the other one, so that two ranges with a ratio of 1:10 can be obtained.

The timer comprises a housing 301 within which all component parts have been mounted. The front panel has two slots and two straight scales, one for the contrast and one for the time. A movable slide is provided within each slot and these slides are actuated by knobs 302 and 303 respectively. On top of the timer is again a push button 304 which actuates the resetting device of the micro-switch 313 which is again of the "maintained contact" type. A pivoted lever 306 is rotatably mounted within the housing and supports a long cylindrical roller 320 the purpose of which will be explained later. The lever 306 has a projection 321 which at the end of the rotary travel of said lever comes in operative contact with the micro-switch 313. Two motors 307 and 307' are mounted on brackets 310 and 310', and drive a square shaft 308. This shaft does not necessarily have to be square, but may be triangular or round with a keyway or the like. In the appended claims this shaft is called polygonal and it will be understood that obvious modifications of this cross section shall be construed to fall within this definition. The two motors 307 and 307' are of the same type described above, i. e., of the synchronous type and equipped with magnetic gear engaging means. The built-in reduction gears of both motors shall, of course, be of different ratios so that the operator may select one of two speed ranges. Since the motors are arranged opposite each other as shown, one must rotate in a clockwise and the other in a counter-clockwise direction.

Mounted on shaft 308 is a spiral shaft cam 309 which is now equipped with a hub 322. The outer periphery of cam 309 is in contact with the aforementioned long cylindrical roller 320. It has been found that the presence of this roller very effectively minimizes friction between cam and lever 306. The hub 322 has a square hole and the cam assembly can, therefore, slide on the square shaft 308. This is done by shifting knob 303. Attached to knob 303 is a connecting piece 323 which terminates in a fork which engages the hub 322.

A second micro-switch 314 of the "momentary contact" type, as distinguished from the "maintained contact" type described above, is arranged in such a manner that it will be actuated sooner or later by lever 306 during its rotary travel. Exactly as described above, the first switch 313 controls the illumination of the enlarger, terminating it after lever 306 has finished its stroke, whereas the second switch 314 controls the color shift and is being actuated sooner or later during the stroke of lever 306. The instance of this actuation depends upon the position of switch 314 which can be adjusted in the following manner: Inspection of Fig. 13 discloses that switch 314 is mounted on a pivoted lever 315. The right end of this lever is urged upwardly by a spring 324. Approximately in the middle of this lever is a small roller 325 which makes contact with a straight cam 326. This cam 326 is, in turn, connected to knob 302 by a connecting member 327. It will be clear that, if knob 302 is moved to the right or to the left, cam 326 will be moved likewise thereby depressing roller 325 and with it lever 315 or permitting both to rise. This, in turn, changes the position of switch 314 and thereby the instant by which the rotary lever 306 will actuate it during its stroke. This is accomplished by a cam-like projection 330, shown in Figs. 12 and 13, which is connected to lever 306 by a connecting piece 331. A small switch 332, Fig. 10, permits the operator to energize selectively either motor 307 or 307' thereby using one of the two timing ranges.

The function of this device is precisely the same as that of the timer shown in Fig. 6 or 7.

It is obvious that various other changes in form, proportions and minor details of construction may be resorted to without departing from the principle or sacrificing any of the advantages of the invention as defined in the appended claims.

What we claim as new is:

1. A contrast control device for photographic enlargers and printers, comprising a source of light, a color changing device and a timing device, said timing device comprising a pivoted lever, means to rotate said lever, means to adjust the speed of rotation of said lever, a first switch controlling said color changing device and adapted to be actuated by said lever during its rotation, means to adjust the position of said first switch relative to said lever whereby said switch may be actuated sooner or later during the rotary travel of said lever, and a second switch controlling said source of light and adapted to be actuated by said lever at the end of its travel, whereby said source of light is being shut off.

2. A contrast control device according to claim 1, the angle of rotation of said lever being less than 30°.

3. A contrast control device according to claim 1, said means to rotate said lever comprising an electric motor with a built-in speed reducing gear train and a magnetically operated gear shift which automatically engages the gear train when said motor is energized, and means to return said lever to its initial position as soon as said motor is de-energized and said gear train disengaged.

4. A contrast control device for photographic enlargers and printers, comprising a source of light, a color changing device and a timing device, said timing device comprising a pivoted lever, means to rotate said lever, means to adjust the speed of rotation of said lever, a first switch controlling said color changing device and adapted to be actuated by said lever during its rotation, means to adjust the position of said first switch relative to said lever whereby said switch may be actuated sooner or later during the rotary travel of said lever, and a second switch controlling said source of light and adapted to be actuated by said lever at the end of its travel, whereby said source of light is being shut off, said means to rotate said lever comprising an electric motor, a spiral shaped cam in operative contact with said lever, and a reduction gear driven by said motor and driving said cam.

5. A contrast control device according to claim 4, said means to adjust the speed of rotation of said lever comprising means to shift said motor with its reduction gear and cam in a direction parallel to the initial position of said lever.

6. A contrast control device according to claim 4, said means to rotate said lever including a shaft of polygonal cross section driven by said motor, the axis of said shaft being parallel to said lever in its initial position, and said cam having a hub with a correspondingly polygonal hole and being slidably mounted on said shaft, said means to adjust the speed of rotation of said lever comprising means to slide said cam on said shaft.

7. A contrast control device according to claim 1, said means to rotate said lever including a polygonal shaft, the axis of said shaft being parallel to said lever in its initial position, two motors with reduction gears of different ratios mounted on opposite ends of said shaft, respectively, and adapted to drive said shaft at different rates of speed, a spiral shaped cam with a hub with a correspondingly polygonal hole mounted slidably on said shaft, and said means to adjust the speed of rotation of said lever comprising switching means to energize selectively one of said motors and means to slide said cam on said shaft.

8. A contrast control device according to claim 1, said first switch being of the momentary contact type, its contacts returning to their initial position after the removal of the actuating force, and said second switch being of the maintained contact type, its contacts remaining in their new position after the removal of the actuating force, and manual means to reset said second switch, a new cycle of operations being started upon actuation of said resetting means.

9. The electric circuit for a contrast control device according to claim 1, comprising said second switch in series with a circuit composed of three parallel branches, said second switch having a pair of normally open contacts, and being of the maintained contact type, its contacts remaining in their new position after the removal of the actuating force, the first of said branches containing a motor driving said rotating lever, the second of said branches containing a lamp, constituting said source of light, and the third of said branches containing electromagnetic means actuating said color changing device, in series with said first switch.

10. The electric circuit for a contrast control device according to claim 1, comprising a relay with its coil in series with said second switch and with a push-button, said second switch having a pair of normally closed contacts, and said push-button having a pair of normally open contacts, said relay actuating two pairs of normally open contacts, the first pair of said contacts being connected to the corresponding contacts of said push-button, thereby forming a lock-in switch for said relay, the second pair of said contacts being in series with a circuit with three parallel branches, a motor driving said rotating lever in the first branch, a lamp constituting said source of light in said second branch, and electro-magnetic means actuating said color changing device, in series with said first switch, in the third branch.

11. A contrast control device according to claim 1, said color changing device comprising two filters of different colors and electromagnetic means to shift one or the other of said filters into a position between said source of light and a sheet of sensitized material on which a print is being made.

12. A contrast control device according to claim 1, said color changing device comprising two reflectors of different colors and electromagnetic means to shift one or the other of said reflectors into a position where it reflects light coming from said source onto a sheet of sensitized material on which a print is being made.

ALFRED SIMMON.
LOUIS L. WEISGLASS.